(12) United States Patent
Shingaki et al.

(10) Patent No.: US 11,609,969 B2
(45) Date of Patent: Mar. 21, 2023

(54) INFORMATION PROCESSING APPARATUS, INFORMATION PROCESSING SYSTEM, INFORMATION PROCESSING METHOD, AND COMPUTER PROGRAM PRODUCT

(71) Applicant: KABUSHIKI KAISHA TOSHIBA, Tokyo (JP)

(72) Inventors: Ryusei Shingaki, Setagaya (JP); Masaaki Takada, Abiko (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 123 days.

(21) Appl. No.: 17/184,683

(22) Filed: Feb. 25, 2021

(65) Prior Publication Data
US 2022/0083035 A1 Mar. 17, 2022

(30) Foreign Application Priority Data
Sep. 15, 2020 (JP) .............................. JP2020-154629

(51) Int. Cl.
G06F 17/18 (2006.01)
G05B 19/418 (2006.01)
(52) U.S. Cl.
CPC ....... *G06F 17/18* (2013.01); *G05B 19/41885* (2013.01)
(58) Field of Classification Search
CPC ........................................................ G06F 17/18
See application file for complete search history.

(56) References Cited

U.S. PATENT DOCUMENTS

| 2013/0116991 A1 | 5/2013 | Hido |
| 2013/0116992 A1 | 5/2013 | Hido |
| 2014/0058528 A1* | 2/2014 | Contreras-Vidal .... A61B 5/291 600/383 |

FOREIGN PATENT DOCUMENTS

| FR | 2923052 A1 * | 5/2009 | ............. G06Q 40/00 |
| JP | 2016139336 A * | 8/2016 | |
| JP | 6189254 B2 | 8/2017 | |
| JP | 6616889 B2 | 12/2019 | |
| WO | WO 2013/069568 A1 | 5/2013 | |
| WO | WO-2014188202 A1 * | 11/2014 | ......... G01N 33/6887 |

OTHER PUBLICATIONS

Vidaurre et al., "A Survey of L1 Regression" International Statistical Review (2013), 81, 3, 361-387 (Year: 2013).*

* cited by examiner

*Primary Examiner* — John C Kuan
(74) *Attorney, Agent, or Firm* — Oblon, McClelland, Maier & Neustadt, L.L.P.

(57) ABSTRACT

According to an embodiment, an information processing apparatus is configured to set a candidate for a time lag until analysis target data including at least one of a measurement item and a setting item for use in control of a process controller affects an objective variable, and a time-lag number allowed in a regression model; select, as a candidate for an explanatory variable, at least one of the measurement item measured at a time corresponding to the candidate for the time lag and the setting item set at the time; and determine a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter.

15 Claims, 4 Drawing Sheets

INFORMATION PROCESSING APPARATUS, INFORMATION PROCESSING SYSTEM, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-154629, filed on Sep. 15, 2020; the entire contents of which are incorporated herein by reference.

FIELD

An embodiment described herein relates generally to an information processing apparatus, an information processing system, an information processing method, and a computer program product.

BACKGROUND

In plant management, it has been widely performed that a regression model that predicts a difficult-to-measure process variable from sensor data of the plant is constructed and a soft sensor that monitors the predicted value based on the regression model instead of the difficult-to-measure process variable. For example, there has been conventionally known a technique in which automatic extraction of a large amount of features is performed with a penalized regression model to construct a regression model.

With such a conventional technique, however, it has been difficult to control the number of time lags associated with each piece of analysis target data, when constructing a regression model that predicts a process variable.

DETAILED DESCRIPTION

According to an embodiment, an information processing apparatus includes a setting unit, a selection unit, and a determination unit. The setting unit is configured to set a candidate for a time lag until analysis target data including at least one of a measurement item measured by a sensor and a setting item for use in control of a process controller affects an objective variable, and a time-lag number allowed in a regression model that predicts the objective variable. The selection unit is configured to select, as a candidate for an explanatory variable, at least one of the measurement item measured at a time corresponding to the candidate for the time lag and the setting item set at the time. The determination unit is configured to determine a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter, and determine the regression model using the determined regularization parameter.

An embodiment of an information processing apparatus, an information processing system, an information processing method, and a program will be described in detail with reference to the accompanying drawings.

Exemplary Hardware Configuration

Figure 1:
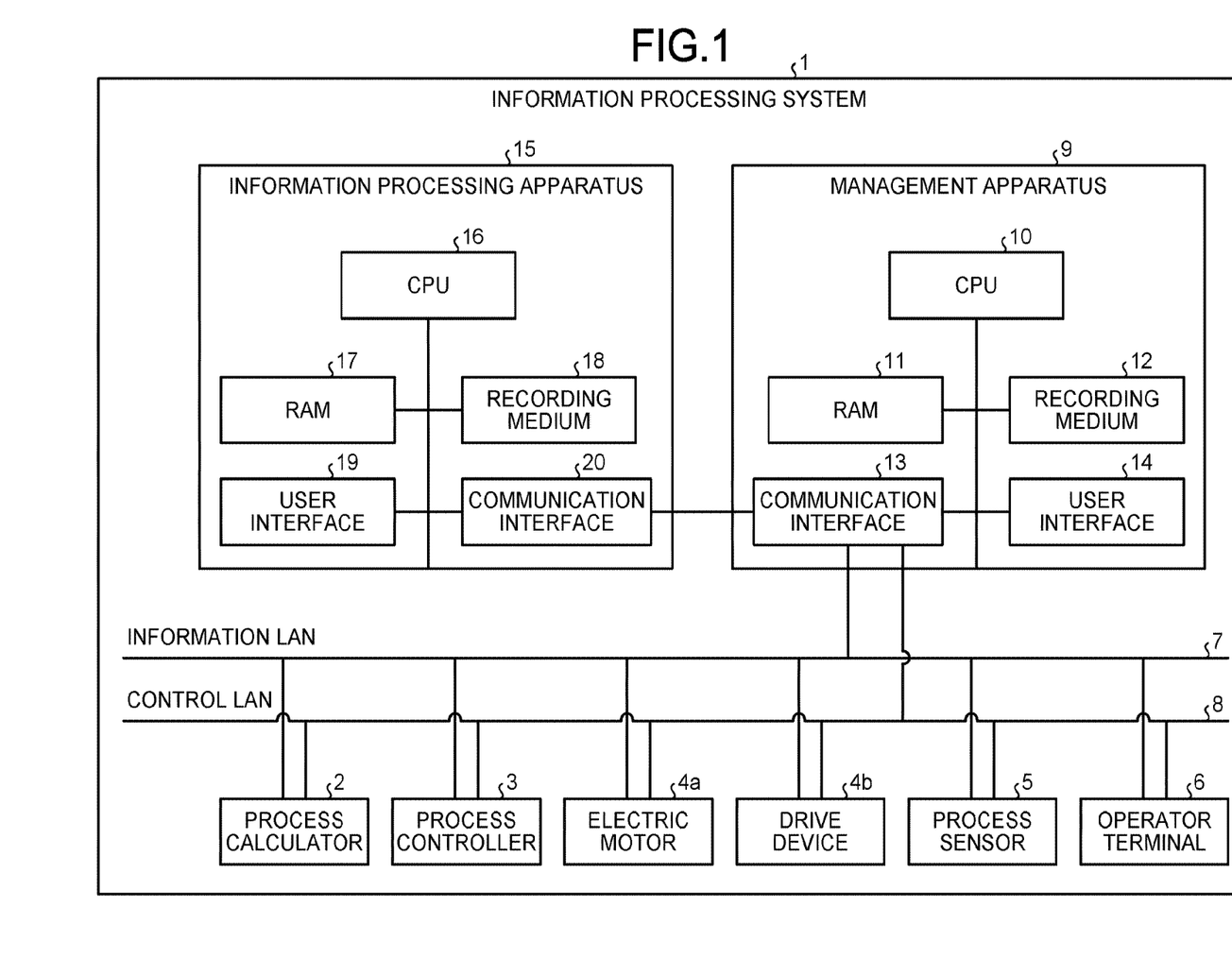
FIG. 1 is a diagram of an exemplary hardware configuration of an information processing system of an embodiment.

FIG. 1 is a diagram of an exemplary hardware configuration of an information processing system 1 of the embodiment. The information processing system 1 of the embodiment is a system for managing a plant. The information processing system 1 of the embodiment includes a process calculator 2, a process controller 3, an electric motor 4a, a drive device 4b, a process sensor 5, an operator terminal 6, an information local area network (LAN) 7, a control LAN 8, a management apparatus 9, and an information processing apparatus 15.

The process calculator 2, the process controller 3, the electric motor 4a, the drive device 4b, the process sensor 5, and the operator terminal 6 are connected to the management apparatus 9 via the information LAN 7 and the control LAN 8.

For example, the management apparatus 9 collects time-series data from the process calculator 2, the process controller 3, and the process sensor 5 via the information LAN 7, and accumulates the time-series data in the management apparatus 9. The time-series data collected from the process calculator 2 is, for example, manufacturing information related to a plant, and quality information and production information output each time a product is manufactured in the plant.

The manufacturing information is information related to a control target to be used in manufacturing a product. For example, when the control target is a valve, the manufacturing information includes the control target value of the valve, the information indicating the operation of the valve, the observed value according to the operation of the valve, and the like. The quality information indicates the quality of a manufactured product. The production information includes information such as the production volume of the product.

The time-series data collected from the process controller 3 is, for example, a setting value for use in control of the process controller 3. The time-series data collected from the process sensor 5 is, for example, a measurement value. The process sensor 5 is, for example, a pressure sensor, a fluid sensor, a temperature sensor, or the like.

In addition, the management apparatus 9 collects control information related to process control from the process controller 3 via the control LAN 8 and accumulates the control information in the management apparatus 9.

The process controller 3, the electric motor 4a, the drive device 4, and the process sensor 5 each transmit and receive control information via the control LAN 8.

The operator terminal 6, for example, sets and operates the process controller 3 via the information LAN 7 and the control LAN 8.

The management apparatus 9 includes a central processing unit (CPU) 10, a random access memory (RAM) 11, a recording medium 12, a communication interface 13, and a user interface 14. The CPU 10 is connected to the RAM 11, the recording medium 12, the communication interface 13, and the user interface 14 via a bus, and controls the RAM 11, the recording medium 12, the communication interface 13, and the user interface 14. Furthermore, the CPU 10 sequentially executes computer programs stored in the recording medium 12.

The RAM 11 includes a static random access memory (SRAM), a dynamic random access memory (DRAM), a flash memory, and the like. In execution by the CPU 10, the RAM 11 reads a computer program or the like stored in the recording medium 12 as needed, and temporarily stores the computer program or the like.

The recording medium 12 includes a hard disk drive (HDD), a solid state drive (SSD), and the like. The recording medium 12 stores a computer program for accumulating the above time-series data in a database and the database for storing the time-series data.

The communication interface 13 is an interface for connecting to the information LAN 7, the control LAN 8, and the information processing apparatus 15.

The user interface 14 includes a display, a keyboard, a mouse, and the like. The user interface 14 accepts input from the user and outputs information.

The information processing apparatus 15 includes a CPU 16, RAM 17, a recording medium 18, a user interface 19, and a communication interface 20. The CPU 16 is connected to the RAM 17, the recording medium 18, the user interface 19, and the communication interface 20 via a bus, and controls the RAM 17, the recording medium 18, the user interface 19, and the communication interface 20. Furthermore, the CPU 16 sequentially executes computer programs stored in the recording medium 18.

The recording medium 18 includes an HDD, an SSD, and the like. The recording medium 18 stores a measurement value obtained from the process sensor 5, and a computer program for calculating the magnitude of time delay (time lag) at the time when the setting value or the like of the process controller 3 is recorded, in comparison with the time when quality information or production information transmitted from the process calculator 2 is recorded. In addition, the recording medium 18 also stores a computer program for extracting the measurement value from the process sensor 5 that contributes to fluctuations in the quality information, the production information, and the like transmitted from the process calculator 2. Furthermore, the recording medium 18 stores a computer program for extracting the setting value of the process controller 3 that contributes to the fluctuation of the quality information, the production information, and the like transmitted from the process calculator 2.

The RAM 17 includes an SRAM, a DRAM, a flash memory, and the like. In execution by the CPU 16, the RAM 17 reads a computer program or the like stored in the recording medium 18 as needed, and temporarily stores the computer program or the like.

The user interface 19 includes a display, a keyboard, a mouse, and the like. The user interface 19 accepts input from the user and outputs information. The output information is, for example, the above time lag; and the measurement value that contributes to fluctuations of the quality information, the production information, and the like, and the setting value transmitted from the process calculator 2.

The communication interface 20 is an interface for connecting to the information LAN 7, the control LAN 8, and the management apparatus 9.

Exemplary Functional Configuration

Figure 2:
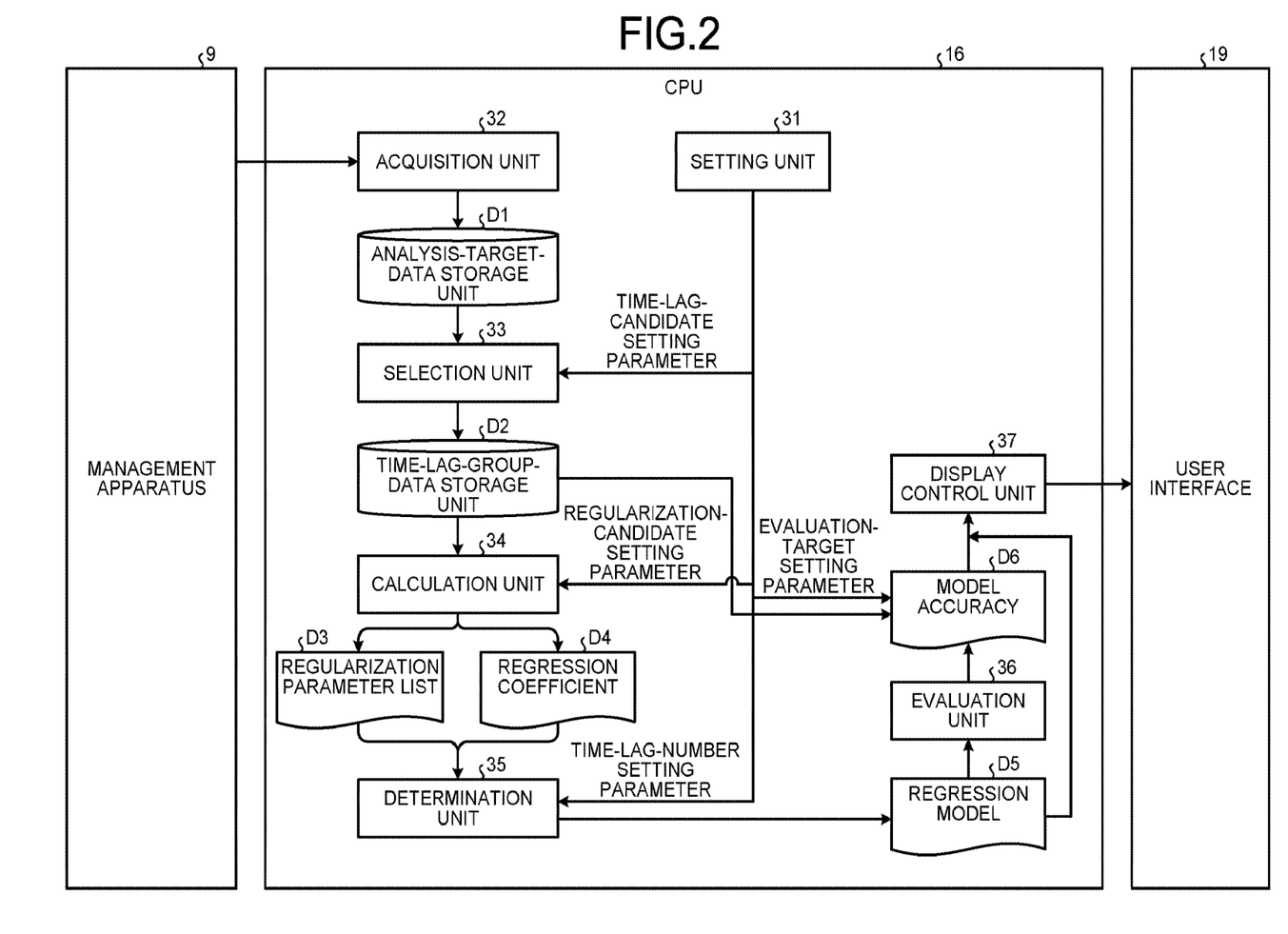
FIG. 2 is a diagram of an exemplary functional configuration of an information processing apparatus of the embodiment.

FIG. 2 is a diagram of an exemplary functional configuration of the information processing apparatus 15 of the embodiment. The information processing apparatus 15 of the embodiment includes a setting unit 31, an acquisition unit 32, a selection unit 33, a calculation unit 34, a determination unit 35, an evaluation unit 36, and a display control unit 37. The setting unit 31, the acquisition unit 32, the selection unit 33, the calculation unit 34, the determination unit 35, the evaluation unit 36, and the display control unit 37 are achieved by, for example, a computer program read from the recording medium 18 to the RAM 17. In addition, an analysis-target-data storage unit D1 and a time-lag-group-data storage unit D2 are achieved by the RAM 17 and the recording medium 18.

Exemplary Information Processing Method

Figure 3:
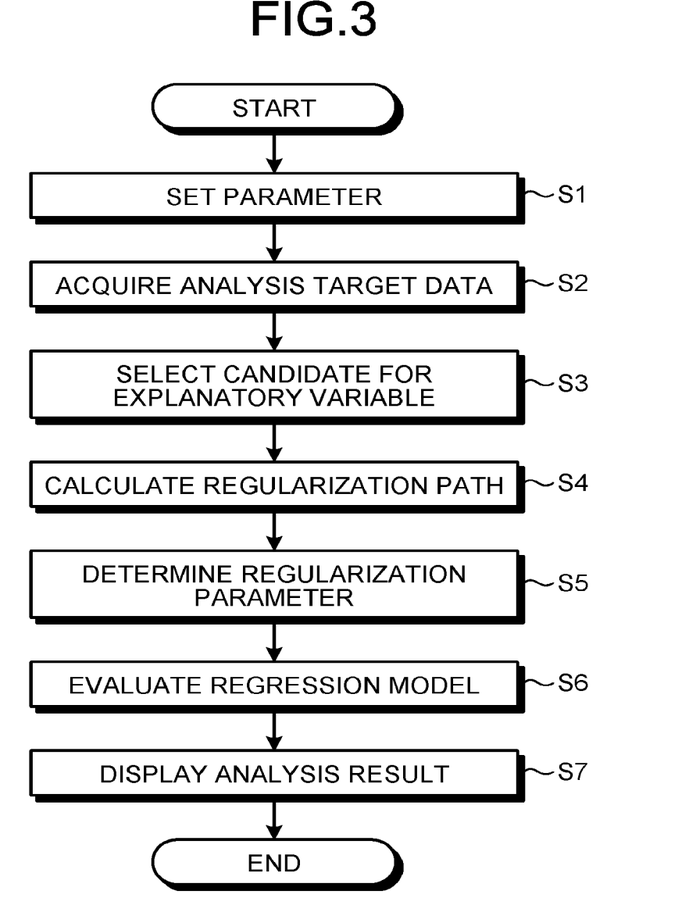
FIG. 3 is a flowchart of an exemplary information processing method performed by the information processing apparatus of the embodiment.

FIG. 3 is a flowchart of an exemplary information processing method performed by the information processing apparatus 15. First, the setting unit 31 sets parameters input via the user interface 19 (Step S1). The parameters input via the user interface 19 are an analysis-target setting parameter, an analysis-target-period setting parameter, a time-lag-candidate setting parameter, a regularization-candidate setting parameter, a time-lag-number setting parameter, an evaluation-target setting parameter, and the like.

The analysis-target setting parameter is a parameter for setting analysis target data including one or more analysis items. The analysis items include at least one of a measurement item measured by the process sensor 5 and a setting item for use in the control of the process controller 3. In the case of a measurement item, a measurement value of the process sensor 5 that measures the measurement item is to be analyzed. Note that the number of measurement items to be set as analysis target data may be selected freely. In the case of a setting item, a setting value of the process controller 3 in which the setting item is set is to be analyzed. Note that the number of setting items to be set as analysis target data may be selected freely. The analysis-target-period setting parameter is a parameter for setting the analysis (learning) target period of the analysis target data.

The time-lag-candidate setting parameter includes the unit of the time lag to be considered in the analysis and the maximum value of the time lag. The unit of the time lag to be considered in the analysis is, for example, 30 min. In addition, the maximum value of the time lag is, for example, 360 min. In this case, it means to consider the possible occurrence of time delay by, such as 30 min, 60 min, 90 min, . . . , and 360 min.

The regularization-candidate setting parameter is a parameter for setting a candidate for a regularization parameter. The candidate for the regularization parameter may be a discrete value within a predetermined range of values or a continuous value. For regularization of a regression model, for example, methods such as L1 regularization, smoothly clipped absolute derivation (SCAD), and minimax concave penalty (MCP) are used.

The time-lag-number setting parameter is a parameter for setting the time-lag number allowed in the regression model that predicts an objective variable. For example, if at most one time lag is allowed for each explanatory variable (for example, measurement value and setting value), the time-lag number is set to 1.

The evaluation-target setting parameter is a parameter for setting the evaluation target period of the regression model.

Next, the acquisition unit 32 acquires, as analysis target data, data that matches the analysis-target setting parameter and the analysis-target-period setting parameter, from the time series data accumulated in the management apparatus 9, and then stores the analysis target data in the analysis-target-data storage unit D1 (Step S2). Note that the acquisition unit 32 may perform a processing process on the acquired analysis target data. For example, when the analysis target data includes a measurement value, the processing process includes removal of noise included in the measurement value, smoothing of the measure value, interpolation based on the moving average of the measurement value, and the like.

Next, the selection unit 33 selects, as time-lag-group data indicating a candidate for the explanatory variable, at least one of the measurement item measured at the time corresponding to each candidate for a time lag and the setting item set at the time, and then stores the selected time-lag-group data in the time-lag-group-data storage unit D2 (Step S3).

Specifically, for example, when the analysis target data is a measurement value measured for the K number of measurement items measured by the process sensor 5 and the candidates for the time lag are 30 min, 60 min, and 90 min, the selection unit 33 selects the time-series data $m_{t,1}$, $m_{t,2}, \ldots, m_{t,K}$ of the measurement item of time t with no time lag; the time-series data $m_{t-30}, m_{t-30}, \ldots, m_{t-30,K}$ of the measurement item measured 30 min before; the time-series data $m_{t-60,1}, m_{t-60,2}, \ldots, m_{t-60,K}$ of the measurement item measured 60 min before; and the time-series data $m_{t-90,1}, m_{t-90,2}, \ldots, m_{t-90,K}$ of the measurement item measured 90 min before. Note that time t is a variable representing the time included in the analysis target period. The time-lag-group data at time t in this case is a set of candidates for the explanatory variable $(m_{t,1}, m_{t,2}, \ldots, m_{t,K}, m_{t-30}, m_{t-30,2}, \ldots, m_{t-30,K}, m_{t-60,1}, m_{t-60,2}, \ldots, m_{t-60,K}, m_{t-90,1}, m_{t-90,2}, \ldots, m_{t-90,K})$.

In addition, for example, when the analysis target data is a setting value set for the J number of setting items set in the process controller 3 and the candidates for the time lag are 60 min and 120 min, the selection unit 33 selects the time-series data $s_{t,1}, s_{t,2}, \ldots, s_{t,J}$ of the setting item of time t with no time lag; the time-series data $s_{t-60,1}, s_{t-60,2}, \ldots, s_{t-60,J}$ of the setting item set 60 min before; and the time-series data $s_{t-120,1}, s_{t-120,2}, \ldots, s_{t-120,J}$ of the measurement item set 120 min before. The time-lag-group data at time t in this case is a set of candidates for the explanatory variable $(s_{t,1}, s_{t,2}, \ldots, s_{t,J}, s_{t-60,1}, s_{t-60,2}, \ldots, s_{t-60,J}, \ldots, s_{t,J}, s_{t-120,1}, s_{t-120,2}, \ldots, s_{t-120,J})$.

For the unit of the time lag and the maximum value of the time lag, a default value may be used, instead of setting in the processing of Step S1.

The calculation unit 34 reads the time-lag-group data stored in the time-lag-group-data storage unit D2, and calculates, for each analysis item (measurement item or setting item), a regularization path indicating the transition of the regression coefficient for the candidate for the explanatory variable that varies in accordance with the value of the regularization parameter of the regression model (Step S4). The calculation unit 34 calculates such a regularization path by using, for example, a penalized regression with L1 regularization.

Exemplary Regularization Path

Figure 4:
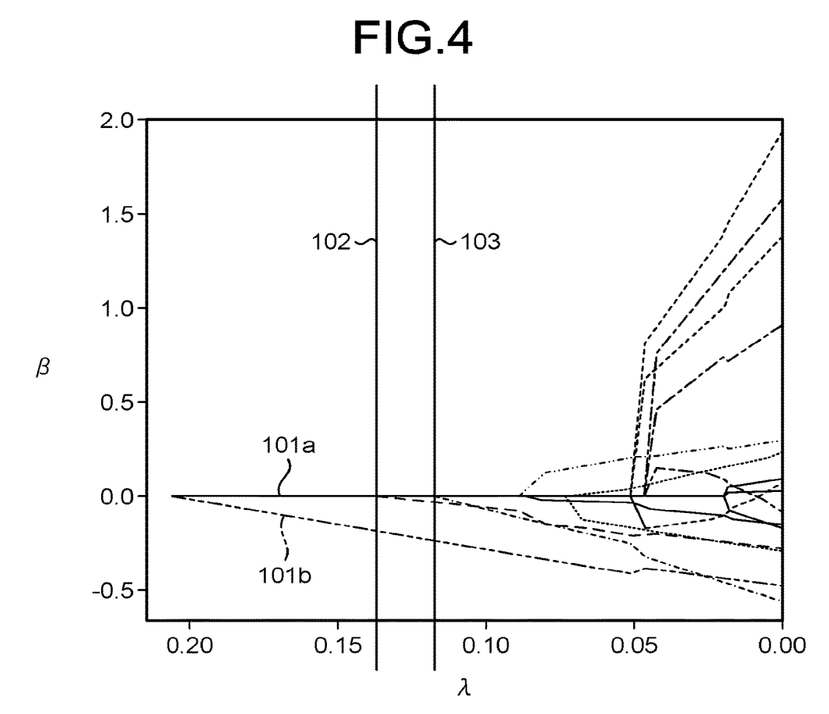
FIG. 4 is a graph of exemplary regularization paths of the embodiment.

FIG. 4 is a graph of exemplary regularization paths of the embodiment. λ on the horizontal axis represents the value of a regularization parameter, and β on the vertical axis represents a regression coefficient. Each break line indicates a regularization path corresponding to candidates for an explanatory variable (for example, one measurement item of the process sensor 5 or one setting item of the process controller 3) of a penalized regression model that predicts an objective variable (for example, quality information and production information). For example, in the case of a regularization path for a measurement value indicating temperature that is one of the measurement items, each break line corresponds to the measurement value of the temperature in consideration of a different time lag. The data to be used for calculating the regularization path is acquired by the acquisition unit 32, based on the analysis-target setting parameter and the analysis-target-period setting parameter above. A candidate for the regularization parameter may be given based on the above regularization-candidate setting parameter, or a default value may always be used. Graphs indicating such regularization paths will be obtained for the number of measurement items or the number of setting items.

Based on the number of measurement items or the number of setting items, and the acquired regularization paths, the determination unit 35 determines regularization parameters λ for the number of measurement items or the number of setting items such that the number of time lags are the time-lag number set by the setting unit 31 (for example, 1) or less. For example, when the time-lag number set by the setting unit 31 is 1, the regularization parameters λ are determined to be values near the vertical line 102. Note that the regression coefficient β of the break line 101a is always 0, and thus the measurement item or the setting item having the time lag corresponding to the break line 101a is excluded from the explanatory variable of the penalized regression model. In a case where the regularization parameters λ are determined to be values value near the vertical line 102, the time lag of the measurement item or the setting item corresponding to this regularization path is determined to be the time lag corresponding to the regularization path indicated by the break line 101b.

Furthermore, for example, when the time-lag number set by the setting unit 31 is 2, the regularization parameters λ are determined to be values near the vertical line 103.

Referring back to FIG. 3, the determination unit 35 then receives the regularization parameter list D3 and the regression coefficient D4 according to the regularization parameter list D3 from the calculation unit 34, and accepts the above time-lag-number setting parameter from the setting unit 31. Then, the determination unit 35 determines a regularization parameter λ for each analysis item (measurement item or setting item) from the regularization parameter list D3 such that the number of time lags is the time-lag number (for example, 1) set with the time-lag-number setting parameter, newly sets the maximum value of the regularization parameters λ as a regularization parameter, and then determines the regression model D5 (penalized regression model) (Step S5).

Next, based on the above evaluation-target setting parameter, the evaluation unit 36 reads the time-lag-group data from the time-lag-group-data storage unit D2, evaluates the performance of the regression model (D5) with the time-lag-group data, and then calculates the model accuracy (D6) such as a determination coefficient ($R^2$) or a mean squared error (MSE) (Step S6). Particularly, the evaluation unit 36 specifies the evaluation target period of the regression model (D5) from the evaluation-target setting parameter, and uses, among the pieces of time-series data included in the time-lag-group data, the time-series data according to the time lag to be evaluated, for evaluation of the regression model (D5).

Next, the display control unit 37 accepts the regression model D5 and the model accuracy D6, and then displays display information based on the regression model D5 and the model accuracy D6 on the user interface 19 (Step S7). The display information includes, for example, the objective variable, the explanatory variable of the regression model D5, and the time lag based on the regularization parameter used for the determination of the regression model D5.

Exemplary Display Information

Figure 5:
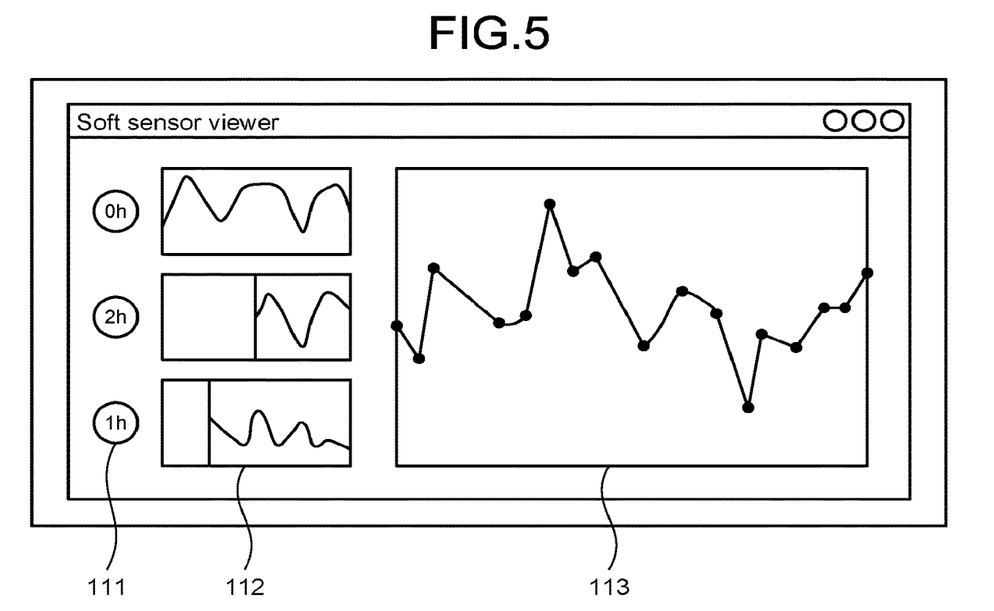
FIG. 5 illustrates exemplary display information of the embodiment.

FIG. 5 illustrates exemplary display information of the embodiment. Each display 111 indicates the time lag of an explanatory variable. For an explanatory variable (for example, measurement item of the process sensor 5 and setting item of the process controller 3) that affects an objective variable (for example, quality information and production information) without time delay, the time lag is displayed as, for example, 0 h. Each graph 112 indicates the time-series data of the values of the explanatory variable. The graph 112 is displayed by sliding in accordance with the time lag indicated on the display 111. The graph 113 indicates the time-series data of the values of an objective variable. As in the example of FIG. 5, the measurement value of the process sensor 5 that does not affect the objective variable (for example, quality information and production information) and the setting value of the process controller 3 are not displayed, so that fluctuation factors for the objective variable can be confirmed more efficiently.

As described above, in the information processing apparatus 15 of the embodiment, the setting unit 31 sets the candidates (for example, 0 h, 1 h, . . . , 6 h) for the time lag until the analysis target data including at least one of the measurement item measured by the process sensor 5 and the setting item for use in the control of the process controller 3, and the time-lag number allowed in the regression model D5 that predicts the objective variable. The selection unit 33 selects, as the candidate for the explanatory variable, at least one of the measurement items measured at the time corresponding to the candidate for the time lag and the setting item set at the time. Then, based on the regularization path indicating the transition of the regression coefficient D4 for the candidate for the explanatory variable that varies in accordance with the value of the regularization parameter of the regression model D5, the determination unit 35 determines the regularization parameter $\lambda$ such that the number of time lags are the time-lag number set by the setting unit or less, and then determines the regression model D5 with the determined regularization parameter $\lambda$.

Thus, according to the information processing apparatus 15 of the embodiment, when constructing a regression model that predicts a process variable, there can be controlled the number of time lags associated with each piece of analysis target data. Specifically, for example, in plant management, when a physical unknown fixed time lag is present between the measurement time point of a process variable that is difficult to be measured and the measurement time point of the sensor to be used for prediction of the process variable, the regression coefficient can be calculated for the explanatory variable with the expectable time lag delayed for the regularization parameter list D3. Setting, in advance, the time-lag number allowed in the regression model D5 to 1 enables to select exactly one suitable time lag for each process sensor 5 without selecting a plurality of time lags for the same process sensor 5, for example.

Note that the functions of the information processing apparatus 15 of the embodiment may be achieved by a program (software).

A program that is executed by a computer is recorded in a computer-readable storage medium such as a CD-ROM, a memory card, a CD-R, or a digital versatile disc (DVD) in an installable or executable format file, and is provided as a computer program product.

Alternatively, the program that is executed by the computer may be stored on the computer connected to a network such as the Internet, and may be provided by being downloaded via the network. Alternatively, the program that is executed by the computer may be provided via a network such as the Internet, without being downloaded.

Alternatively, the program that is executed by the computer may be incorporated in a ROM or the like in advance and the incorporated program may be provided.

The program that is executed by the computer has a module configuration including a functional block achievable by the program among the functional configurations (functional blocks) of the above information processing apparatus 15. As practical hardware, each of the functional blocks is loaded on the RAM 17 by the CPU 16 reading the program from the storage medium and executing the program.

Note that each of the above functional blocks may be achieved by hardware such as an integrated circuit (IC), without being achieved by software.

When each function is achieved with a plurality of processors, each processor may achieve one of the functions, or may achieve two or more of the functions.

In addition, the operation mode of the computer that achieves the information processing apparatus 15 may be selected freely. For example, the information processing apparatus 15 may be achieved by one computer. Furthermore, for example, the information processing apparatus 15 may be operated as a cloud system on a network.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory; and
one or more hardware processors electrically coupled to the memory and configured to function as:
a measurement control unit configured to cause a sensor to measure a measurement value of a measurement item;
a setting unit configured to set a candidate for a time lag until analysis target data including at least one of the measurement item measured by the sensor and a setting item for use in control of a process controller affects an objective variable, and a time-lag number allowed in a regression model that predicts the objective variable;
a selection unit configured to select, as a candidate for an explanatory variable, at least one of the measurement item measured at a time corresponding to the candidate for the time lag and the setting item set at the time; and
a determination unit configured to determine a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter, and determine the regression model using the determined regularization parameter.

2. The apparatus according to claim 1, wherein
the measurement item includes a plurality of measurement items,
the setting item includes a plurality of setting items,
the analysis target data includes, as a plurality of analysis items, at least either the plurality of measurement items or the plurality of setting items, and
the determination unit is configured to determine, based on the regularization path, the regularization parameter such that the number of the time lag is equal to or less than the time-lag number, for each of the plurality of analysis items, and determine the regression model using the determined regularization parameter.

3. The apparatus according to claim I, wherein the setting unit is configured to set a plurality of candidates as the candidate for the time lag, and sets the time-lag number to 1.

4. The apparatus according to claim 1, wherein the hardware processors are further configured to function as:
a display control unit configured to display, on a display unit, display information including the objective variable, the explanatory variable of the regression model, and the time lag based on the regularization parameter used to determine the regression model.

5. The apparatus according to claim 1, wherein the hardware processors are further configured to function as:
a calculation unit configured to calculate the regularization path.

6. The apparatus according to claim 5, wherein the calculation unit is configured to calculate the regularization path using a penalized regression with L1 regularization.

7. The apparatus according to claim 5, wherein the calculation unit is configured to select a value of the regularization parameter from a regularization parameter list including a plurality of regularization parameters.

8. The apparatus according to claim 1, wherein the hardware processors are further configured to function as:
an acquisition unit configured to acquire the analysis target data.

9. The apparatus according to claim 8, wherein
the analysis target data includes the measurement item, and
the acquisition unit is configured to perform, on the acquired measurement item, a processing process including at least one of removal of noise included in the measurement item, smoothing of the measurement item, and interpolation based on a moving average of the measurement item.

10. An information processing system comprising:
a sensor configured to measure a measurement value of a measurement item;
a memory; and
one or more hardware processors electrically coupled to the memory and configured to function as:
a setting unit configured to set a candidate for a time lag until analysis target data including at least one of the measurement item and a setting item for use in control of a process controller affects an objective variable, and a time-lag number allowed in a regression model that predicts the objective variable;
a selection unit configured to select, as a candidate for an explanatory variable, at least one of the measurement item measured at a time corresponding to the candidate for the time lag and the setting item set at the time; and
a determination unit configured to determine a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter, and determine the regression model using the determined regularization parameter.

11. The system according to claim 10, wherein the hardware processors are further configured to function as:
a display control unit configured to display, on a display unit, display information including the objective variable, the explanatory variable of the regression model, and the time lag based on the regularization parameter used to determine the regression model.

12. A computer program product comprising a non-transitory computer readable medium including programmed instructions, the instructions causing a computer to function as:
a measurement control unit configured to cause a sensor to measure a measurement value of a measurement item;
a setting unit configured to set a candidate for a time lag until analysis target data including at least one of the measurement item measured by the sensor and a setting item for use in control of a process controller affects an objective variable, and a time-lag number allowed in a regression model that predicts the objective variable;
a selection unit configured to select, as a candidate for an explanatory variable, at least one of the measurement item measured at a time corresponding to the candidate for the time lag and the setting item set at the time; and
a determination unit configured to determine a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter, and determine the regression model using the determined regression parameter.

13. The computer program product according to claim 12, wherein the instructions cause the computer to further function as:
a display control unit configured to display, on a display unit, display information including the objective variable, the explanatory variable of the regression model, and the time lag based on the regularization parameter used to determine the regression model.

14. An information processing method comprising:
measuring, by a sensor, a measurement value of a measurement item;
setting, by an information processing apparatus, a candidate for a time lag until analysis target data including at least one of the measurement item measured by the sensor and a setting item for use in control of a process controller affects an objective variable, and a time-lag number allowed in a regression model that predicts the objective variable;
selecting, by the information processing apparatus, as a candidate for an explanatory variable, at least one of the measurement item measured at a time corresponding to the candidate for the time lag and the setting item set at the time; and
determining, by the information processing apparatus, a regularization parameter of the regression model such that a number of the time lag is equal to or less than the time-lag number, based on a regularization path indicating transition of a regression coefficient for the candidate for the explanatory variable, the regression coefficient varying in accordance with a value of the regularization parameter, and determining the regression model using the determined regularization parameter.

15. The method according to claim 14, comprising:
controlling display of display information, by the information processing apparatus, on a display unit, the display information including the objective variable, the explanatory variable of the regression model, and the time lag based on the regularization parameter used to determine the regression model.

\* \* \* \* \*